Aug. 25, 1964 L. C. HOLTZENDORFF 3,145,961
BRANCH ATTACHING DEVICE
Filed Sept. 4, 1962

INVENTOR.
L.C.Holtzendorff
BY Moses, Mc.Glew & Toren
ATTORNEYS.

United States Patent Office 3,145,961
Patented Aug. 25, 1964

3,145,961
BRANCH ATTACHING DEVICE
Lucian Clive Holtzendorff, 101 W. Moore St.,
Valdosta, Ga.
Filed Sept. 4, 1962, Ser. No. 221,673
5 Claims. (Cl. 248—42)

This invention relates to a device designed to attach and hold an extra branch to a tree trunk so as to permit the symmetrical appearance of the tree to be improved. It is particularly advantageous for use in the case of natural Christmas trees which lack branches at visible spots.

The device consists of two or more parts which, when attached together, utilize the weight of the tree branch to hold the device firmly in place on the tree trunk and also to hold the branch in proper position.

In the accompanying drawings which illustrate a preferred embodiment of the invention:

Figure 1:
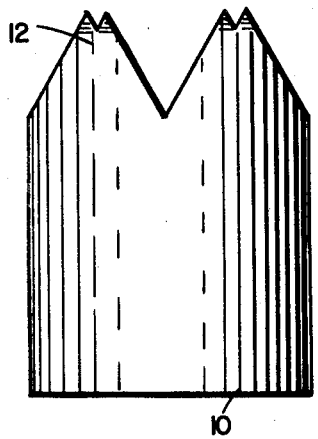
FIG. 1 is a front elevation of the tree trunk enclosing member of the device.
Figure 2:
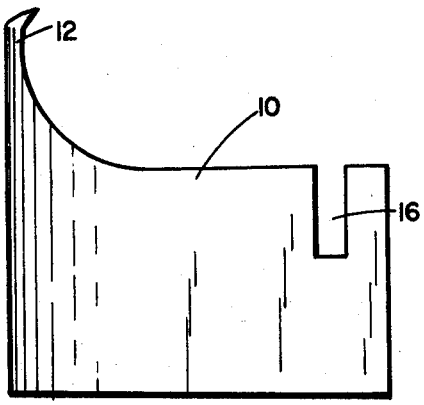
FIG. 2 is a side elevation and FIG. 3 is a plan view thereof.
Figure 3:
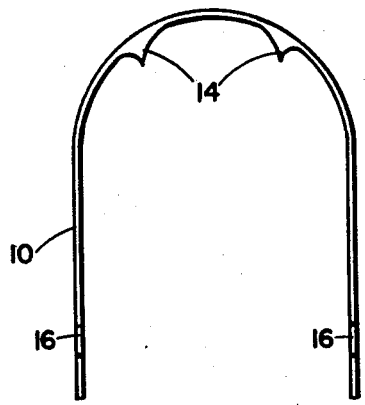
Figure 4:
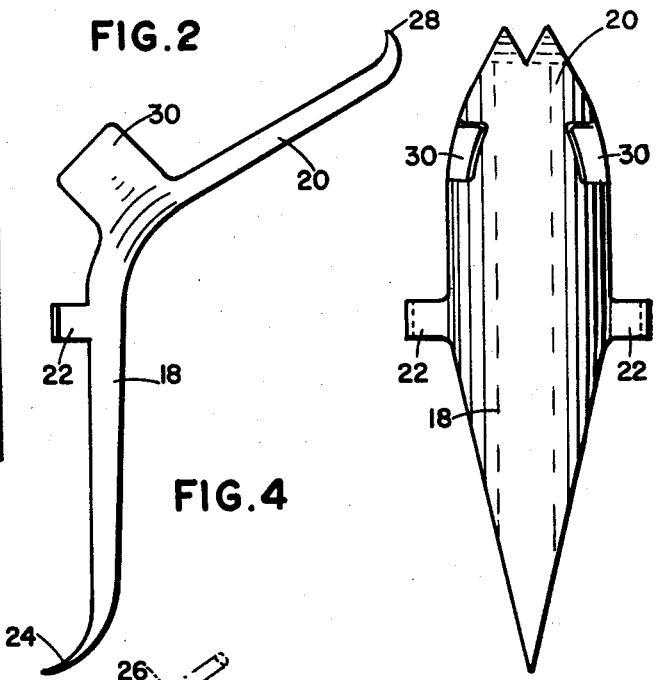
FIG. 4 is a side elevation of the cooperating member for holding the branch.
Figure 5:
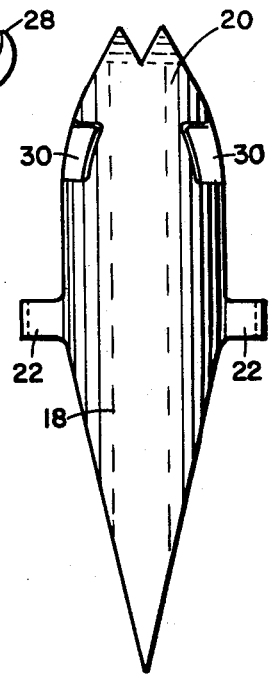
FIG. 5 is a front elevation of such member.
Figure 6:
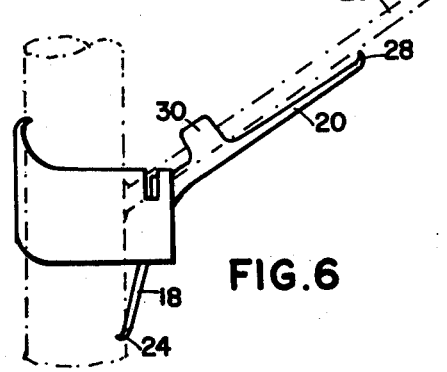
FIG. 6 is a side elevation of the device assembled showing the trunk of the tree and the branch in dotted lines.

The member shown in FIGS. 1, 2 and 3 comprises a piece of sheet metal 10 bent into U-shape and having two or more upwardly projecting portions 12 which terminate in inwardly bent points or tangs 14. The legs of the U-shaped member near their front ends are provided with open topped slots 16. This U-shaped member is placed around the tree trunk and the second member of the device comprising a downwardly projecting leg 18 and an outwardly projecting leg 20 is placed in position. This second member is preferably of channel-shaped cross section so as to fit better against the trunk and more firmly hold the branch. This member has laterally projecting short arms or lugs 22 which are dropped into the slots 16. At the lower end of the downwardly projecting leg 18 is an inwardly bent pointed portion or tang 24 which bears against the side of the tree trunk. The tree branch indicated in broken lines at 26 in FIG. 6 is placed on the projecting leg 20 and is engaged by a sharp tang 28 on the end of the leg. The lower end of the branch is engaged between lugs 30 which may be bent inwardly so as to partially enclose and firmly hold the lower end of the branch. The weight of the branch itself, bearing on the extension leg 20, pivots the branch carrying member about the lugs 22 as a fulcrum and causes the sharp point or tang 24 to bite into the side of the tree trunk. At the same time, the tangs 14 are drawn tight against the tree trunk.

While I have illustrated but one specific form of the invention, it will be understood that modified structures may be employed which are within the scope of the invention so long as the principles thereof are utilized.

What is claimed is:

1. A device for attaching a branch to a tree trunk, comprising a member enclosing the trunk having a tang adapted to engage the trunk, said member also having notches therein and a second member having lugs for engaging and pivoting in said notches and having a downwardly projecting leg with a sharp tang thereon for engaging the side of the tree trunk, said member having an outwardly extending portion provided with means for gripping and holding a branch.

2. A construction as claimed in claim 1, in which the means for holding the branch includes bendable lugs engaging the branch near the base thereof.

3. A means for attaching a branch to a tree trunk, comprising a sleeve member partially enclosing said trunk and having inwardly turned sharp pointed portions on the upper part thereof for engaging the trunk and a second member pivotally attached to said sleeve member, said second member comprising a downwardly extending leg having a tang at the lower end thereof for engaging the side of the trunk, said second member having an upwardly and outwardly sloping leg provided with a tang at its outer end for engaging the underside of the branch and having a bendable lug thereon for engaging the branch near the lower end thereof.

4. A construction as claimed in claim 3, in which the branch carrying member is of channel-shaped sheet metal and in which the pivotal connection between the two members comprises notches formed in an upper wall of the trunk engaging member, the branch engaging member having outwardly projecting lugs fitting loosely in said notches so as to permit limited pivotal movement thereof.

5. A means for attaching a branch to a tree trunk comprising a sleeve member surrounding said trunk and a branch holding member pivotally engaged with said sleeve member, said branch holding member having a leg projecting downwardly below the pivotal connection between said members held against the side of the tree trunk by the weight of the branch and cooperating with the sleeve member to firmly clamp the tree trunk, the branch holding member being formed of sheet metal and having a branch holding leg extending laterally above said pivotal connection and provided with bendable lugs extending upward from the edges thereof for bending around and holding the branch.

References Cited in the file of this patent
UNITED STATES PATENTS 2,550,023     Reilly ------------------ Apr. 23, 1951
2,941,767     Mogey ------------------ June 21, 1960